June 1, 1965  G. R. SMALL ETAL  3,187,292
JUNCTION DEVICE FOR ELECTRICAL CABLES
Filed Nov. 30, 1962
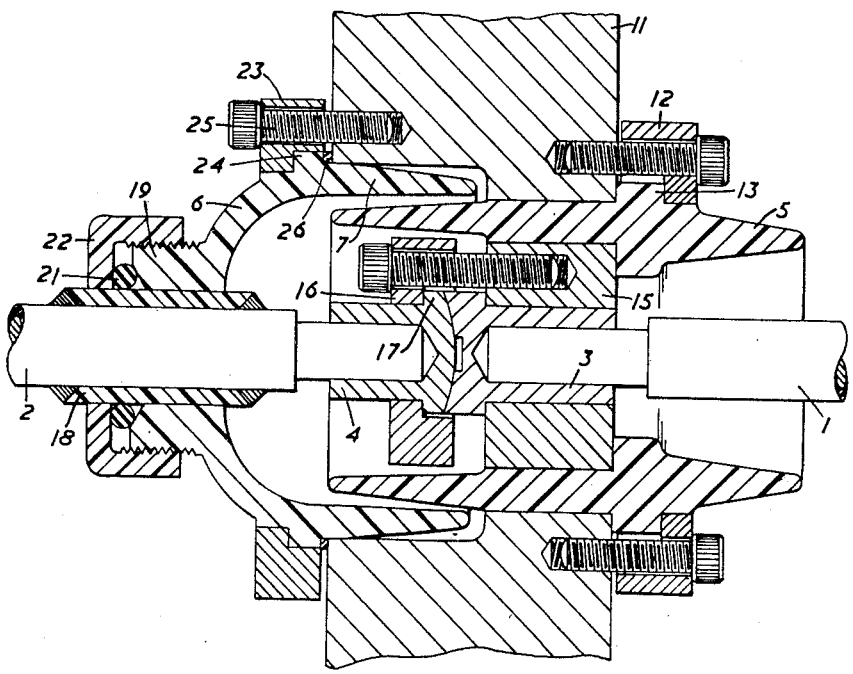
INVENTORS
GEORGE R. SMALL and
WILLIAM E. BECK.
BY *Bosworth, Sessions
Herrstrom and Knowles*
ATTORNEYS 3,187,292
JUNCTION DEVICE FOR ELECTRICAL CABLES
George Robert Small and William Ernest Beck, Edinburgh, Scotland, assignors to Bruce Peebles & Co., Limited, Edinburgh, Scotland, a company of Great Britain
Filed Nov. 30, 1962, Ser. No. 241,239
Claims priority, application Great Britain, Dec. 8, 1961, 44,107/61
5 Claims. (Cl. 339—94)

This invention relates to junction devices for electrical cables and one object is to provide such a junction device which enables one cable to be readily connected and disconnected from another, without the use of insulation in the form of tape or a settable compound and which provides a long leakage path from the conducting parts of the cables to earth over insulating surfaces.

According to the present invention a junction device for joining two electric cables comprises a bushing in the form of an insulating sleeve and a contact member for connection to one of the cables and supported within the bushing with its conducting surfaces displaced inwardly from the ends of the sleeve.

The expression "a contact member for connection to" is to be construed as including obvious equivalents of this for example, cases where the contact member is in fact connected to one of the cables or is in fact a part of one of the cables.

The amount of displacement from the end of the sleeve will depend upon the voltage which has to be applied, so that the creep path to earth can be as long as is necessary.

In fact, if the bushing is supported externally at a position spaced inwardly from the ends of the sleeve, the creep path from the contact-making surface can be almost doubled in length extending first over the inside wall to the end of the sleeve and then back over the outside wall of the sleeve to the earthed support.

Conveniently the contact member is supported within the bushing by a metal member having a high heat capacity compared with that of the contact member so that in the event of short-circuit current having to flow through the junction device, a lot of the energy is absorbed in heating the metal member. It could, for example, be in the form of a disc sealed into the bushing.

In a preferred form of the invention there is a second contact member for connection to the other cable and also displaced inwardly from the ends of the sleeve, and a clamp for holding the contact members together, which clamp is itself releasable from the contact members. This has the advantage that contact members can be held securely together without themselves having to have bolt holes or threaded members or the like.

Finally in order to reduce the risk of a fault due to the presence of moisture near the bare contact surfaces, it is preferred to include a cover having an aperture which can be sealed around one of the cables and sealing means associated with the cover enabling the space within the cover in which the contact members lie to be hermetically sealed. If the cover is of insulating material it too can provide a long creepage path to earth over insulation.

The invention may be carried into practice in various ways and one embodiment will now be described by way of example with reference to the accompanying drawing, of which the single figure is a cross-section of the junction device employing a doubly re-entrant bushing and a part of the base wall of a terminal box into which it is fitted.

A cable 1 from an electric machine is to be capable of ready connection to a cable 2 in the terminal box and leading to an electrical supply for the machine. For this purpose the bared ends of the cables 1 and 2 have soldered to them co-operating contact members 3 and 4 one of which has a concave end surface and the other of which has a corresponding convex end surface.

The two contact members are displaced inwardly from the ends of an epoxy resin sleeve 5 constituting the doubly re-entrant bushing to provide a long creep path to earth over insulation.

The bushing 5 is held in an aperture in the base wall 11 of the terminal box by means of a fastening ring 12 which co-operates with an external flange 13 on the bushing and is bolted to the base wall 11. The bushing 5 has moulded in it a steel collar 15 which forms a seat for the contact member 3, and has a large heat capacity.

The contact member 4 can be held against the contact member 3 by means of a steel ring 16 which engages with an external flange 17 on the contact member 4 and can be bolted to the collar 15.

It has been found that often faults can be prevented by keeping moisture away from the bare parts of the cables and terminals, and accordingly, an insulating epoxy resin cover 6 of roughly hemispherical shape with a depending skirt 7 is fitted around the cable 2 and can be sealed to the base wall 11.

The cover 6 can slide in relation to an insulating resin bush 18 sealed around the cable 2 and a releasable seal can be effected between a collar 19 on the cover 6 and the bush 18 by means of an O-ring 21 and a nut 22 which can be screwed around the collar 19 to force the O-ring into a V-shaped groove between the inner surface of the collar and the outer surface of the bush.

The cover itself can be secured to the base wall 11 of the terminal box by means of a steel ring 23 which engages an external flange 24 on the cover and can be bolted to the base wall 11 at 25. A waterproof sealing gasket 26 is included between the flange 24 and the base wall 11.

The gasket 26 keeps water or moisture from the contact space while disconnection can be readily effected by releasing the ring 23 and the nut 22 to slide off the cover 6 and then by releasing the ring 16. Of course, when remaking the connection no insulation in tape form or in the form of a settable compound needs to be applied.

The re-entrant ends of the bushing 5 ensure that there is the requisite length of creepage path from the contact members to earth as represented by the base 11. The skirt 7 also gives the requisite creepage path from the bare portion of the cable end 2.

The collar 15 has a large heat capacity compared with that of the contact member 3 and accordingly if a short circuit current has to be carried some of the energy is absorbed in heating up the collar with a consequent reduction in the likelihood of destruction of the contact surfaces.

There is also the advantage that, although the creep path to earth over the re-entrant bushing can be quite long, the arcing path can be quite short so that the power of any arc which is struck due to a fault will be kept down.

The clearances between the bushing 5 and the base wall aperture, and between the contact member 3 and the collar 15, will be in accordance with the appropriate standard for flame proof enclosures.

It may be desirable in some circumstances to seal the contact-making space hermetically from the interior of the machine and this could be done by incorporating suitable gaskets between the members 12 and 11 on the one hand and the members 3 and 15 on the other hand.

What we claim as our invention and desire to secure by Letters Patent is:

1. A junction device for connecting two electric power carrying cables one of which leads through an opening in a conducting wall comprising a continuous imperforate insulating sleeve supported on its outside in the opening in the wall and in contact with the wall only at a position spaced from the sleeve ends, contact members for connection to the respective cables positioned within the sleeve, a metal member having a high heat capacity compared with that of said contact members, said metal member supporting one of said contact members within said sleeve, a releasable clamp within the sleeve for holding the contact members together, and an apertured sealing cover with means for sealing the aperture around one of the cables and for sealing the cover to the wall, the cover being spaced radially from the sleeve.

2. A junction device as claimed in claim 1 in which the clamp comprises screw means having co-operating threads respectively on the clamp and the metal member.

3. A junction device as claimed in claim 1 in which the cover is of insulating material.

4. An electrical junction arrangement comprising:
a wall formed with an aperture,
an insulating sleeve member having a through passage with opposite end openings,
means mounting the sleeve member in the wall aperture with the wall and the mounting means engaging the sleeve member solely in an external zone intermediate and spaced from both ends of the sleeve member,
cables for carrying electrical power extending into the sleeve passage, one through one and another through the other of the end openings,
contacting means including members located wholly within the axial limits of the sleeve member and connected one to the end of said one and another to the end of said other of the cables,
  said contact means also including means located within the sleeve and holding the contact members together in releasable relation,
  said contact means engaging the sleeve member solely in an internal zone intermediate and spaced axially from the ends of the sleeve member
a cup shaped cover embracing one of the cables in sealing relation,
  said cover having an open end telescoped over one end of the sleeve member in interfitting relation, and means engaging the cover solely at an external zone of the latter spaced axially from its open end and securing the cover to the wall in sealing relation independently of the sleeve member and with an intervening annular clearance space separating the cover and the sleeve member throughout the axial extent of said interfit.

5. An electrical junction arrangement comprising a wall formed with an aperture,
an insulating sleeve member having a through passage with opposite end openings,
means mounting the sleeve member in the wall aperture with the wall and the mounting means engaging the sleeve member solely in an external zone intermediate and spaced from both ends of the sleeve member,
cables for carrying electrical power extending into the sleeve passage, one through one and another through the other of the end openings,
contact means located wholly within the axial limits of the sleeve member,
  said contact means including members connected one to the end of said one and another to the end of said other of the cables,
a heat conducting ring embracing said one contact member and engaging the sleeve member solely in an internal zone intermediate and spaced axially from both ends of the sleeve member,
  the ring and the one contact member being formed to prevent axial separation of the latter from the ring, and
means holding the other contact member in engagement with said one contact member,
  said holding means being located wholly within the axial extent of said sleeve and solely engaging said other contact member and the ring.

References Cited by the Examiner
UNITED STATES PATENTS

| | | | |
|---|---|---|---|
| 2,176,657 | 10/39 | Finch | 313—21 |
| 2,441,457 | 5/48 | Treanor | 174—152 |
| 2,639,313 | 5/53 | Street | 339—103 |

FOREIGN PATENTS

| | | |
|---|---|---|
| 434,442 | 9/35 | Great Britain. |
| 842,417 | 7/60 | Great Britain. |

JOSEPH D. SEERS, *Primary Examiner.*
W. DONALD MILLER, *Examiner.*